(12) United States Patent
James et al.

(10) Patent No.: US 12,334,520 B2
(45) Date of Patent: Jun. 17, 2025

(54) ELECTRODE TESTING FIXTURE AND SYSTEM FOR MATERIAL CHARACTERIZATION AND STANDARDIZATION

(71) Applicant: GM GLOBAL TECHNOLOGY OPERATIONS LLC, Detroit, MI (US)

(72) Inventors: Robin James, Rochester Hills, MI (US); Stephen J. Andersen, Madison Heights, MI (US); James Joseph Deininger, Wyandotte, MI (US); Raffaello Ardanese, Bloomfield Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 276 days.

(21) Appl. No.: 18/078,927

(22) Filed: Dec. 10, 2022

(65) Prior Publication Data
US 2024/0194958 A1    Jun. 13, 2024

(51) Int. Cl.
*H01M 10/42* (2006.01)

(52) U.S. Cl.
CPC ............... *H01M 10/4285* (2013.01)

(58) Field of Classification Search
CPC ............ H01M 10/4285; B25B 11/005; G01D 21/02
See application file for complete search history.

(56) References Cited

U.S. PATENT DOCUMENTS

| | | | | |
|---|---|---|---|---|
| 2,572,640 | A * | 10/1951 | Lovegrove | G03B 27/60 269/21 |
| 5,067,695 | A * | 11/1991 | Huddleston | B23Q 1/032 269/21 |
| 11,657,494 | B1 * | 5/2023 | Zhao | G06V 10/60 348/106 |
| 2013/0127194 | A1 * | 5/2013 | Regan | A43D 11/00 294/188 |
| 2019/0257794 | A1 | 8/2019 | McGovern et al. | |
| 2022/0404186 | A1 | 12/2022 | Bruder et al. | |

(Continued)

FOREIGN PATENT DOCUMENTS

| | | | |
|---|---|---|---|
| DE | 3208864 A1 * | 9/1983 | |
| TW | M424476 U * | 3/2012 | |
| WO | WO-2015054721 A1 * | 4/2015 | G01M 3/20 |

OTHER PUBLICATIONS

U.S. Appl. No. 17/743,862, filed May 13, 2022, Zeng et al.

*Primary Examiner* — Christopher E Mahoney

(57) ABSTRACT

A fixture assembly for testing or measuring a portion of a battery electrode includes a top plate, a baseplate, a connector and a support member. The top plate includes holes for creating a low-pressure region along a top surface of the top plate to hold the portion of the battery electrode to the top plate. The baseplate includes a bottom plate and side walls. The side walls extend upward from the bottom plate and define a vacuum chamber with the top plate. The connector is attached to the baseplate and configured to be connected to a vacuum hose for drawing air from the vacuum chamber to pull the portion of the battery electrode to the top plate. The support member is attached to the baseplate and configured to hold the fixture assembly in place relative to a measuring device that measures a physical characteristic of the battery electrode.

20 Claims, 11 Drawing Sheets

(56) References Cited

U.S. PATENT DOCUMENTS

| | | | |
|---|---|---|---|
| 2022/0404325 A1 | 12/2022 | Ardanese et al. | |
| 2022/0404430 A1 | 12/2022 | Salvador et al. | |
| 2023/0097287 A1* | 3/2023 | Huemiller | H01M 10/4285 324/426 |
| 2023/0160962 A1* | 5/2023 | Huemiller | H01M 10/4285 324/426 |
| 2023/0170529 A1* | 6/2023 | Xu | H01M 4/382 |
| 2023/0178816 A1* | 6/2023 | Ardanese | G01N 33/0009 |
| 2023/0198034 A1* | 6/2023 | Huemiller | H01M 10/04 |
| 2023/0368367 A1* | 11/2023 | Zeng | H01M 10/4285 |

* cited by examiner

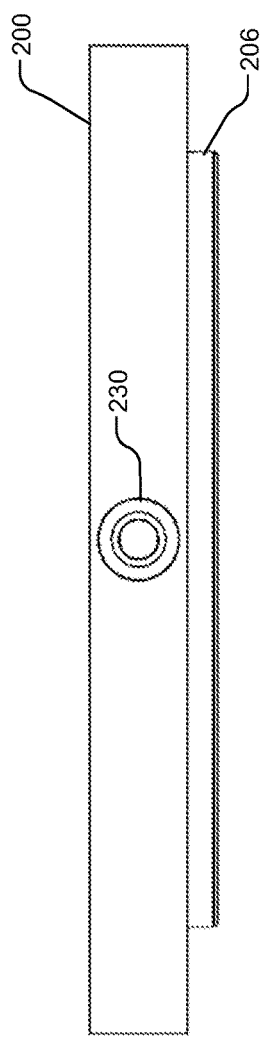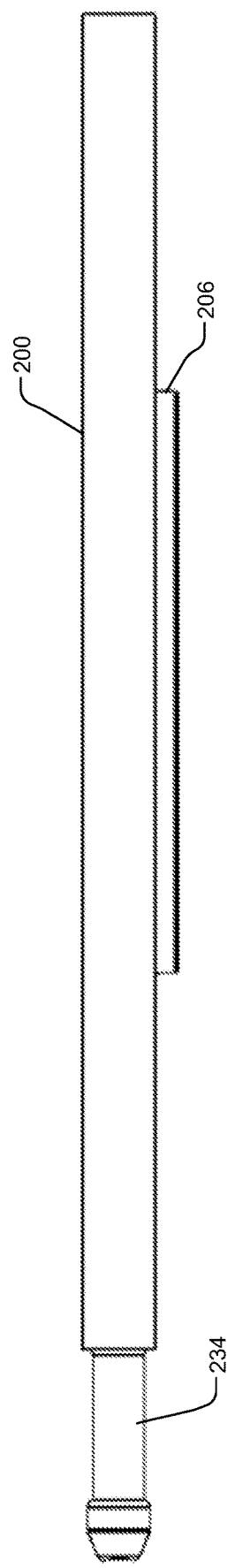

ELECTRODE TESTING FIXTURE AND SYSTEM FOR MATERIAL CHARACTERIZATION AND STANDARDIZATION

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to electrode material characterization systems and devices.

Battery packs of electric vehicles can include an arrangement of electrodes including anodes and cathodes separated by separation layers. The anodes and cathodes include substrates (or current collectors) with active material coatings. The substrates are typically in the form of aluminum or copper foil sheets, which are coated with, for example, an active material such as a lithium (Li) based material.

SUMMARY

A fixture assembly for testing or measuring at least a portion of a battery electrode is disclosed. The fixture assembly includes a top plate, a baseplate, a connector and a support member. The top plate includes holes for creating a low-pressure region along a top surface of the top plate to hold the at least a portion of the battery electrode to the top plate. The baseplate includes a bottom plate and side walls. The side walls extend upward from the bottom plate and define a vacuum chamber with the top plate. The connector is attached to the baseplate and configured to be connected to a vacuum hose for drawing air from the vacuum chamber to pull the at least a portion of the battery electrode to the top plate. The support member is attached to the baseplate and configured to hold the fixture assembly in place relative to a measuring device that measures a physical characteristic of the at least a portion of the battery electrode.

In other features, the holes of the top plate include an array of holes arranged in rows and columns.

In other features, the holes of the top plate include two rows of slots arranged closer to opposite sides of the top plate than a centerline of the top plate and do not include other slots.

In other features, the holes of the top plate include rows of holes arranged closer to opposite sides of the top plate than a centerline of the top plate and do not include other holes.

In other features, the holes include a first set of holes and a second set of holes. The second set of holes are sized differently than the first set of holes.

In other features, the holes include a first set of holes and a second set of holes. The second set of holes are shaped differently than the first set of holes.

In other features, the holes include first rows of holes that are laterally offset from second rows of holes of the top plate.

In other features, the side walls are configured to hold the top plate.

In other features, the side walls include an inner ledge on which the top plate is disposed such that the top surface of the top plate is flush with top surfaces of the plurality of side walls.

In other features, the baseplate includes support pegs for supporting the top plate relative to the bottom plate.

In other features, the support pegs are laterally offset from the holes of the top plate.

In other features, at least two of the top plate, the baseplate, the connector and the support member are integrally formed as a single part.

In other features, two of the side walls include guides. The support member is ring-shaped and includes two pair of tabs extending upward and configured to at least one of engage with and slide adjacent to the guides to position the support member relative to the bottom plate.

In other features, a characterization system is disclosed. The characterization system includes an instrument, the fixture assembly, a vacuum pump, and a network device. The fixture assembly is disposed on or in the instrument. The vacuum pump is connected to the connector of the fixture assembly and configured to draw air from the fixture assembly. The network device is configured to control operation of the instrument and the vacuum pump to hold the at least a portion of the battery electrode to the top plate and measure the physical characteristic of the at least a portion of the battery electrode.

In other features, the instrument includes at least one sensor configured to measure the physical characteristic of the at least a portion of the battery electrode.

In other features, the instrument includes a support plate with a recessed portion. The support member is disposed at least partially within the recessed portion and prevents lateral movement of the fixture assembly relative to the support plate.

In other features, a characterization system for testing and measuring parameters of at least a portion of a battery electrode is disclosed. The characterization system includes an instrument, a fixture assembly, a vacuum pump and a network device. The instrument includes a support plate. The support plate includes a recessed portion. The fixture assembly includes i) a top plate with holes, ii) an inner cavity fluidically coupled to the holes, and iii) a support member. The fixture assembly is disposed on the support plate such that at least a portion of the support member is disposed in the recessed portion of the support plate. The vacuum pump connected to the fixture assembly and configured to draw air from the inner cavity to pull the at least a portion of the battery electrode to the top plate. The network device is configured to control operation of the instrument and the vacuum pump to hold the at least a portion of the battery electrode to the top plate and measure the parameters of the at least a portion of the battery electrode.

In other features, the fixture assembly includes a baseplate including: a bottom plate; side walls extending upward from the bottom plate and defining a vacuum chamber with the top plate; and support pegs disposed between the top plate and the bottom plate.

In other features, the fixture assembly includes side walls. The side walls include guides. The support member is ring-shaped and includes two pair of tabs extending upward and configured to at least one of engage with and slide adjacent to the guides to i) position the support member relative to the top plate, and ii) position the top plate relative to the support plate of the instrument.

In other features, the holes include a first set of holes and a second set of holes. The first set of holes are at least one of shaped and sized differently than the second set of holes.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 5 is an end view of the fixture assembly of FIG. 2;

FIG. 6 is a side view of the fixture assembly of FIG. 2;

In the drawings, reference numbers may be reused to identify similar and/or identical elements.

DETAILED DESCRIPTION

Figure 1:
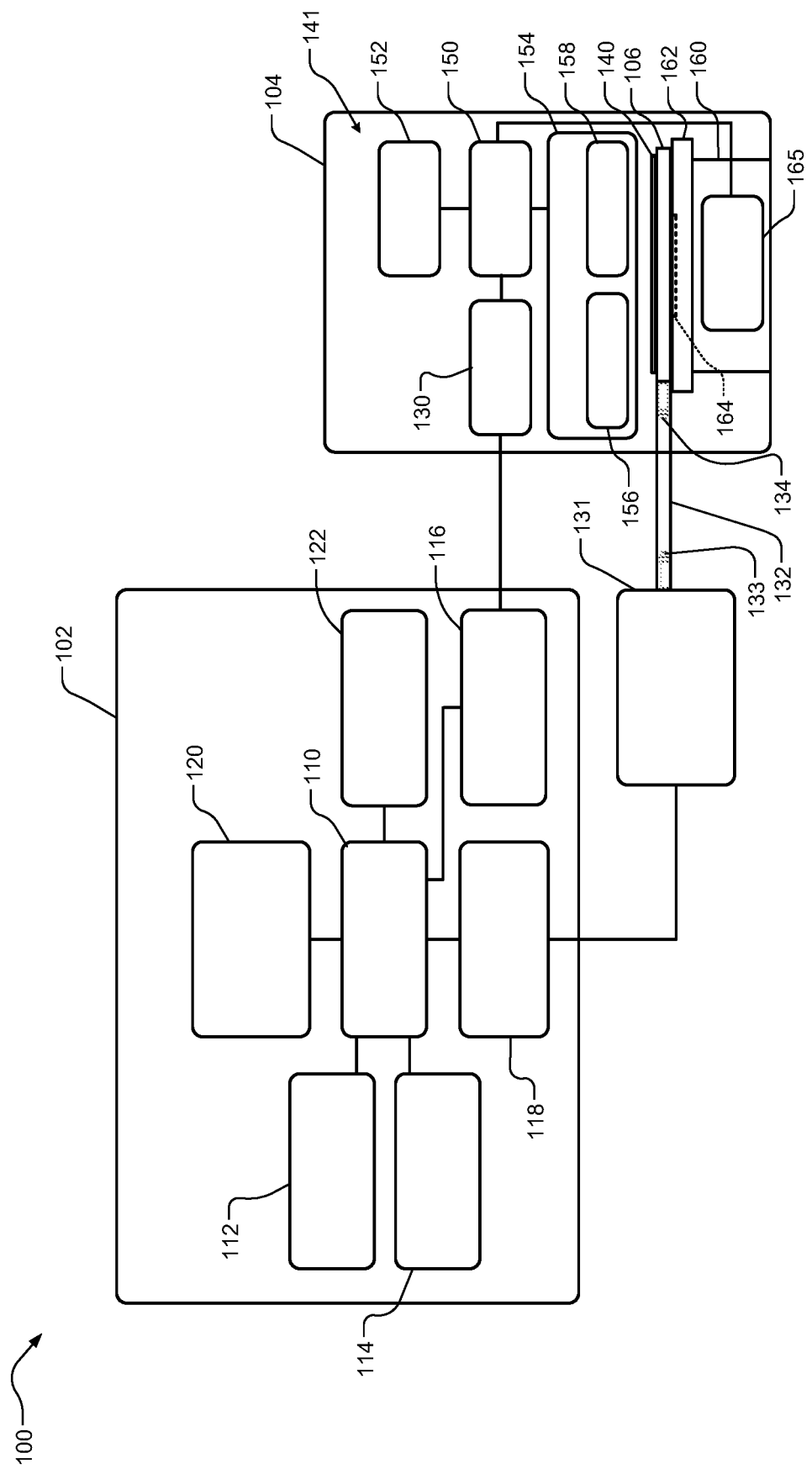
FIG. 1 is functional block diagram of an example characterization system including a fixture assembly in accordance with the present disclosure.
Figure 2:
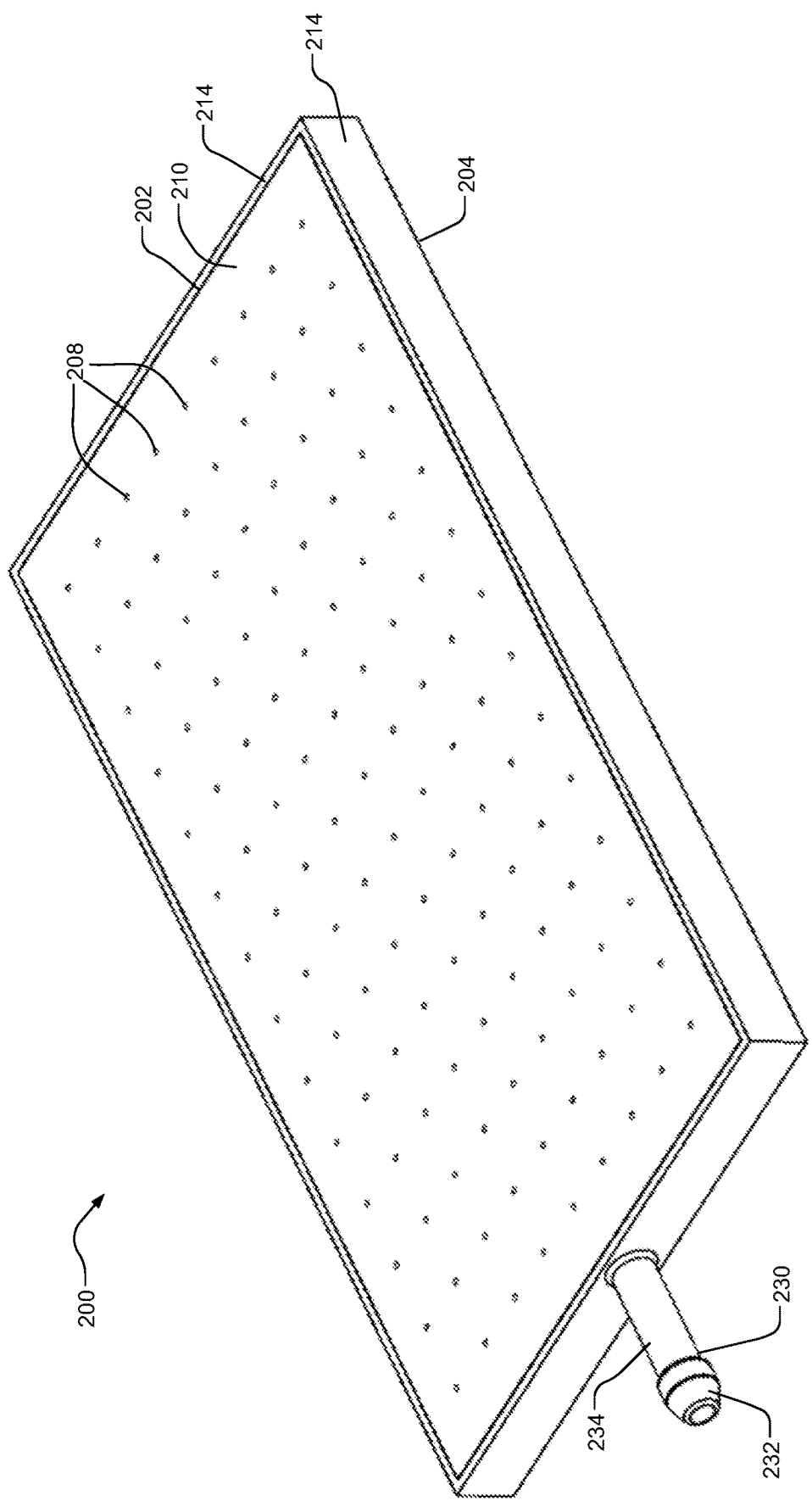
FIG. 2 is a perspective view of an example fixture assembly in accordance with the present disclosure.

Certain types of physical characteristics of battery electrodes can have an adverse effect on electrochemical performance of battery cells. Electrodes of a battery pack can include aluminum cathode foils and copper anode foils, which are implemented as substrates for active material (e.g., lithium (Li)). The cathode and anode foils need to be handled with care to avoid wrinkles and cracks in the foils and the corresponding active material layers. The foils can have thicknesses of 8-15 microns (u) and varying surface areas. It can be difficult to move and handle the foils such that the foils remain flat. In addition, the foils typically need to be moved from station-to-station in order to perform various manufacturing tasks. For example, the foils can be moved i) to a station for application of the active material on the substrates, and ii) to one or more instruments to perform physical characterization of the foils and active material layers. Physical characterization refers to measuring physical characteristics of foils and/or battery electrodes such as: dimensions including length, width and thickness; dimension non-uniformity; layer weight including substrate and coating weights; surface roughness; material density; conductivity; and/or other parameters.

Physical characterization of the foils can be implemented prior to applying active material and/or subsequent to applying the active material. It can be tedious to place the foils and electrodes in a flat manner on or in various instruments such that the foils and electrodes do not have wrinkles, which can cause measurement errors and inaccurate and unreliable measurement data. This is especially true when the physical characterization measurements need to be error free, accurate and reliable. The instruments may be microscopes, nondestructive evaluation systems, imaging devices, etc.

The examples set forth herein include characterization systems and fixture assemblies for robust, reliable, and accurate materials characterization of elements of a battery including battery electrodes and layers thereof. This includes the ability to reliably and accurately measure physical characteristics of the electrodes such as: dimensions including length, width and thickness; dimension non-uniformity; layer weight including substrate and coating weights; surface roughness; material density; conductivity; etc.

In some embodiments, the disclosed examples include additively manufactured testing fixture assemblies that are modular such that the fixture assemblies are able to be retrofitted onto and/or in various measurement devices and systems. The measurement devices and systems include microscopes, nondestructive evaluation systems, imaging instruments and systems, etc. The fixture assemblies allow for easy placement of foils and/or electrodes and maintenance of the foils and/or electrodes in a fixed position and in a flat orientation for various manufacturing operations. The operations include application of active material and/or other materials, cleaning, and physical characterization. The fixture assemblies by maintaining the foils and electrodes in a fixed position and a flat orientation allow for accurate and reliable measurements of physical properties to be taken. The fixture assemblies allow for quick and easy exchange of foils and electrodes. Pressure within the fixture assemblies is i) reduced via a vacuum pump when the foils and electrodes are held in a fixed flat orientation on the fixture assemblies, and ii) is increased to atmospheric pressure when the foils and electrodes are removed from the fixture assemblies. The fixture assemblies are applicable for characterization of two-dimensional (2D) foil current collectors and three-dimensional (3D) foil current collectors (e.g., mesh foils, expanded metal foils, and foils with perforated holes). The foils may be characterized with or without active material.

The fixture assemblies disclosed herein may be manufactured using a machining process and/or 3D printed. As an example, the fixture assemblies may be machined out of metal using, for example, a computer numerical controlled (CNC) machining process. The fixture assemblies may be manufactured using multi-jet fusion (MJF), fusion deposition modeling (FDM), stereolithography (SLA), selective laser sintering (SLS), masked stereolithography (mSLA), and/or digital light processing (DLP). The fixture assemblies may each be made as a single part or as two or more parts. This includes top plates, baseplates, hose connectors, support devices such as support rings, support pegs, etc. The fixture assemblies and/or one or more elements thereof may be manufactured using a vacuum assisted additive manufacturing process such as a multi-jet fusion 3D printing process without using a CNC machining process. The fixture assemblies and/or one or more elements thereof may be formed of metal, a polymer, polylactic acid (PLA), acrylonitrile butadiene styrene (ABS), powder, and/or other suitable material(s). The fixture assemblies may be sized for foils and battery electrodes of different sizes for different battery pack architectures.

FIG. 1 shows an example characterization system 100 that includes a network device 102, an instrument 104, and a fixture assembly 106. The network device 102 may be implemented as a desktop computer, a laptop computer, a tablet, and/or other test monitoring and/or evaluating device. The network device 102 may include a control module 110, a transceiver 112, a memory 114, an instrument interface 116, a pump interface 118, a display 120, and one or more other user interfaces 122. The transceiver 112 may, for example, transfer data collected from the instrument and/or other related information determined based on the collected data to one or more other network devices separate from the network device 102. The memory 114 may store the collected the data and information.

The instrument interface 116 may be connected to an interface 130 of the instrument 104 and communicate with the instrument 104. Data may be transferred from the instrument 104 to the control module 110 via the interfaces 116, 130. The pump interface 118 may be connected to a vacuum pump 131, which draws air from the fixture assembly 106. The control module 110 controls operation of the vacuum pump 131. The vacuum pump 131 may be connected to the fixture assembly 106 via an air line 132. The air line (or hose) 132 may be held on a first connector 133 at the vacuum pump and a second connector 134 at the fixture assembly 106.

During operation, air is drawn by the vacuum pump 131 from the fixture assembly 106 via the air line 132. The fixture assembly 106 includes a top plate with holes, examples of which are shown in FIGS. 2, 7, 9, 10, and 13-15. The drawing of air from the fixture assembly 106 and from the holes pulls and flattens a foil or battery electrode 140 disposed on the fixture assembly 106 to the top plate. The vacuum pump 131 may reduce the pressure within and/or on top of the fixture assembly 106 to 80-100 Torr. This enables the foil or battery electrode 140 to be placed on top of the fixture assembly 106 and be sucked into the vacuum (or low pressure region) created through the holes and be held to the fixture assembly 106 in a flat orientation. The stated pressure range provides the stated suction without deforming the foil or battery electrode 140. This prevents and/or minimizes chances of wrinkling the foil or battery electrode 140, which allows for performing robust and reliable materials characterization measurements on the foil or battery electrode 140. The pressure may be adjusted for different foil and/or electrode thicknesses. The thicker the foil or electrode, the more draw and thus the lower the resultant pressure.

The instrument 104 may be implemented as a microscope, a nondestructive measuring and evaluating system, an imaging system, and/or other measuring device and/or system. The instrument 104 includes a measuring and evaluating system 141 that may include the instrument interface 130, a control module 150, memory 152, and a sensing assembly 154 including actuators 156 and sensors 158. The memory 152 may store data collected from the sensors 158. The actuators may be used to move the locations of the sensors 158 and/or other devices such as lenses, viewing scopes, the sensors 158, etc. The sensors 158 may include image sensors (or cameras), object detection sensors, distance or thickness sensors, etc. The fixture assembly 106 allows the measurements to be taken i) without the sensors 158 contacting the foil or battery electrode 140, and ii) with the sensors 158 contacting the foil or battery electrode 140. This is because the foil or battery electrode 140 is held in place by a low pressure region created across a top surface of the fixture assembly 106.

The instrument 104 may further include a stand 160 with a support plate 162. The support plate 162 (may be referred to as a stage) may include a recessed portion for holding a sample being examined. The fixture assembly 106 may include a support ring or other support member, which may be at least partially disposed in the recessed portion 164. The recessed portion 164 prevents lateral movement of the support member and thus lateral movement of the fixture assembly 106 relative to the support plate 162. Examples of the support member (or ring) are shown in FIGS. 4-8 and 10-13. The stand 160 may include actuators 165 that move the support plate 162 and thus the fixture assembly 106 in X, Y, and Z directions. This movement may be controlled by the control module 150. In an embodiment, the control module 110 controls this movement by signaling the control module 150.

The fixture assembly 106 may be of different sizes and shapes depending on the sizes and shapes of the instrument 104, instrument stand 160, support plate 162, foil or battery electrode 140, etc. Different example fixture assemblies and/or portions thereof are shown in FIGS. 2-15 and described below. Any of these fixture assemblies may be implemented in the characterization system 100 of FIG. 1 and replace the fixture assembly 106.

The fixture assembly 106 enables taking focused images of foils and battery electrodes. When the vacuum pump 131 is on, the foil or battery electrode 140 flattens down on the fixture assembly 106 due to the negative pressure created. As such, the corresponding imaging focal plane of the imaging system is constant (or not distorted). Whereas, in the case of imaging a foil or battery electrode without use of the fixture assembly, the imaging focal plane is distorted because the foil or battery electrode is wrinkled (i.e., not flat). The fixture assembly 106 may be implemented on a microscope and used as a vacuum-assisted microscope fixture that can hold material under test in a flat stationary manner for contact or non-contact measurements including imaging.

FIGS. 2-6 show an example fixture assembly 200 that includes a top plate 202, a baseplate 204, and one or more support elements. In the example shown, the one or more support elements include a support ring 206. The top plate 202 includes an array of holes 208. The holes 208 may be in various different patterns and be of various different sizes and shapes. In an embodiment, a rectangular pattern of holes is included and arranged in rows and columns, where each hole is 1 millimeter (mm) in diameter. The holes 208 extend through the top plate 202 to allow air to be drawn from an outside upper surface 210 of the top plate 202, through the holes 208 and into a cavity (or airflow chamber) 212 defined by the top plate 202 and the baseplate 204. The holes 208 may be have various shapes and sizes to accommodate various pressures.

In an embodiment, the holes 208 include holes of different sizes to provide zones with different pressures. For example, if lower pressure is to be provided near a peripheral portion of a battery electrode, then outer peripherally located holes (e.g., the ones of the holes 208 along a periphery of the fixture assembly 200 and/or along the side walls 214) may be larger in diameter than inner located holes. Other zoned arrangements may be implemented to provide different pressures at different locations of a foil or electrode being tested. As another example, a first portion (or set) of the holes 208 may be shaped differently and/or have different geometries than a second portion (or set) of the holes 208.

Figure 15:
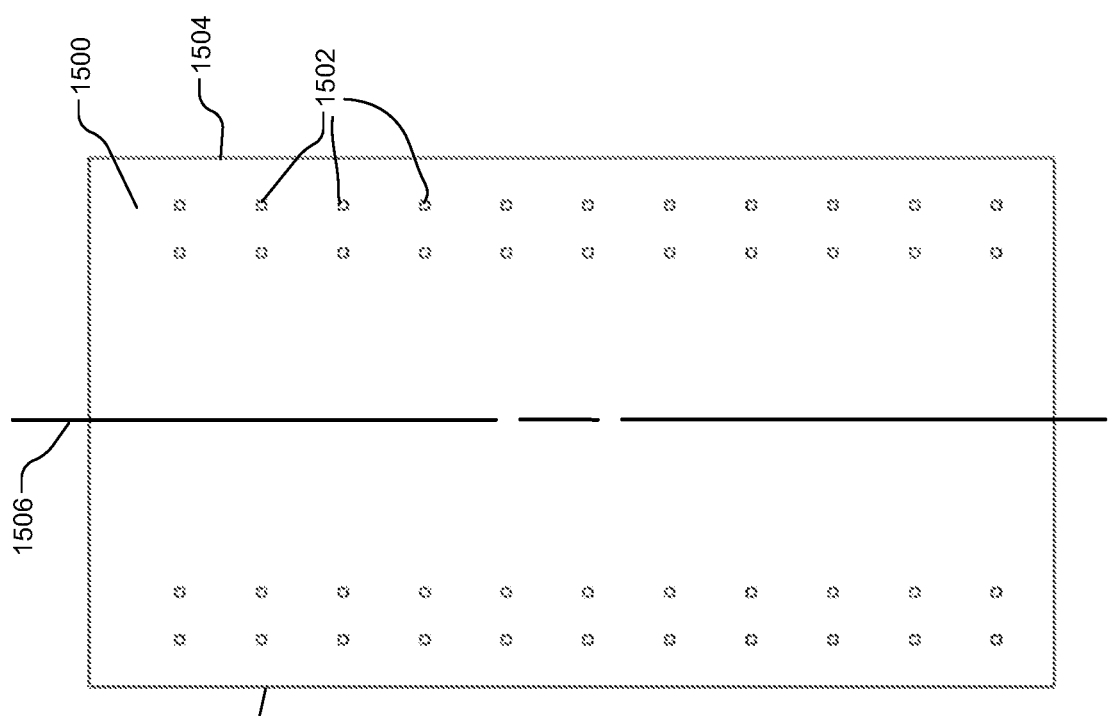
FIG. 15 is a top view of another example top plate with an example pattern of square-shaped vacuum holes in accordance with the present disclosure.
Figure 14:
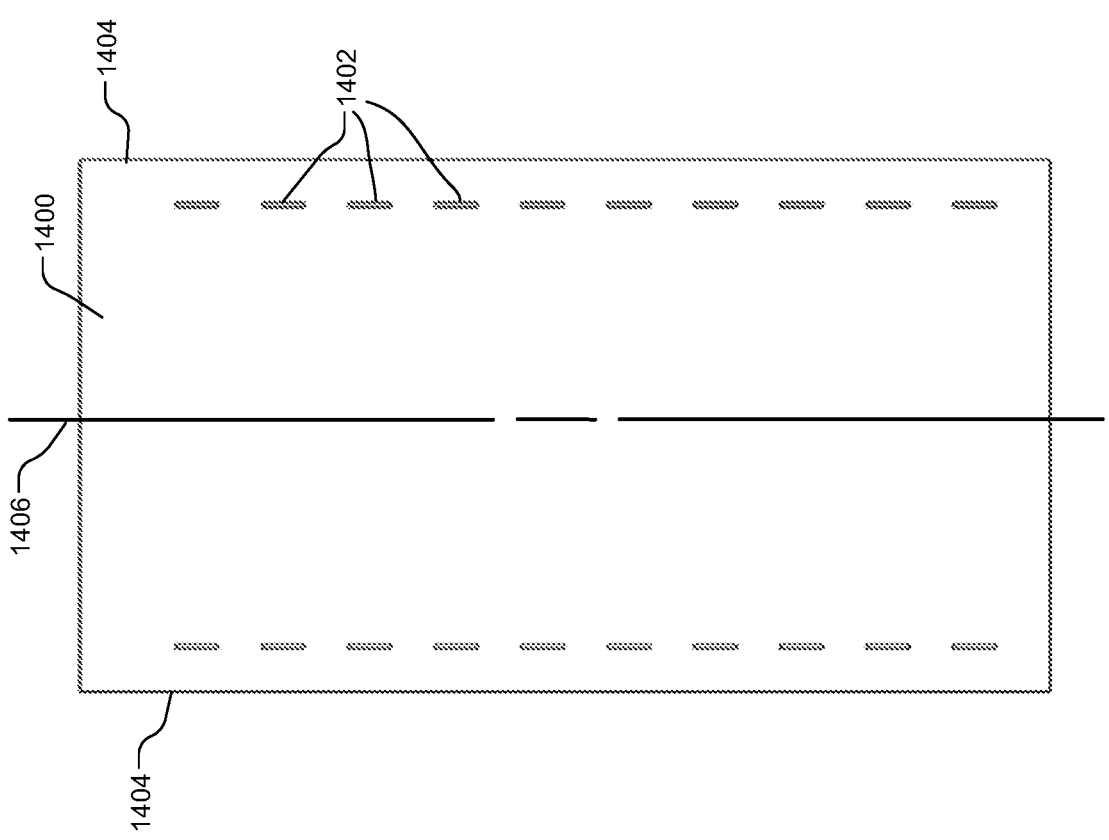
FIG. 14 is a top view of another example top plate with an example pattern of vacuum slots in accordance with the present disclosure.

Any number of zones of holes may be implemented having holes with different sizes and/or shaped. The zones may be adjacent one another, arranged in rows and columns, symmetrically arranged, concentrically arranged, etc. The holes 208 may be sized, shaped, and patterned based on the application of use. For example, different substrates having different thicknesses and/or varying thicknesses, may have different arrangements of holes for different pressure profiles across the top plate 202. Although a particular hole pattern is shown, other hole patterns may be implemented, a couple examples of which are shown in FIGS. 14-15. The holes may be equally spaced from each other. In one embodiment, the holes are arranged in laterally offset rows or offset columns.

Figure 10:
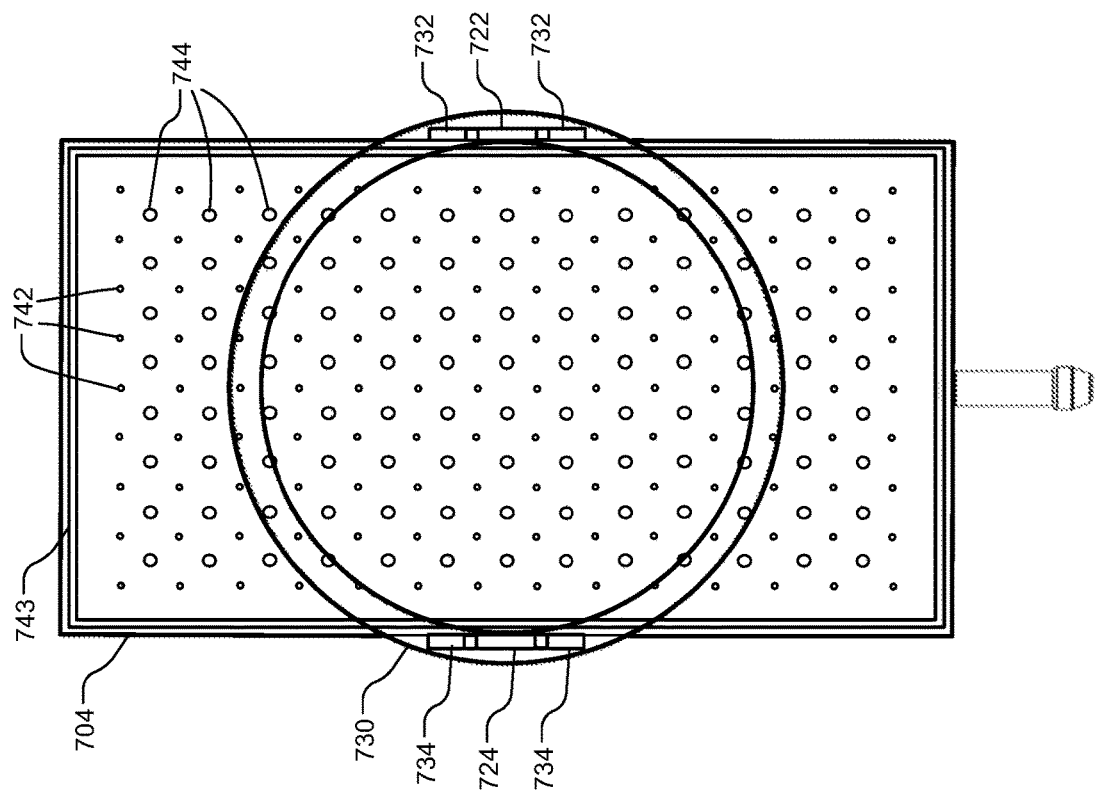
FIG. 10 is a bottom view of the fixture assembly of FIG. 7 illustrating the removable support ring.
Figure 9:
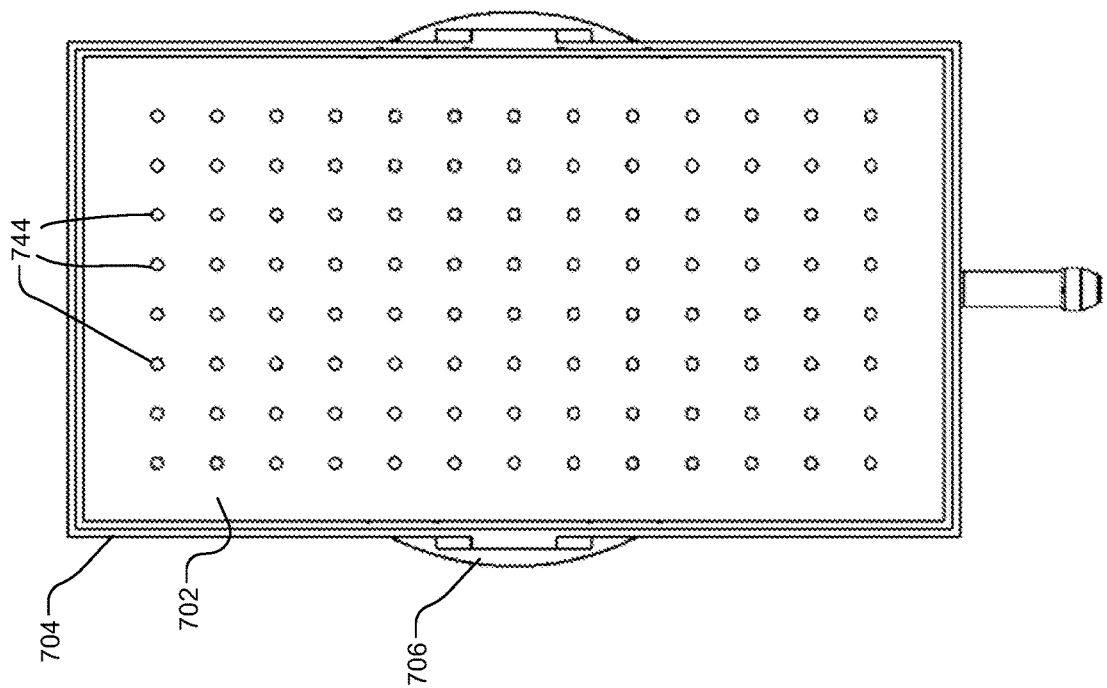
FIG. 9 is a top view of the fixture assembly of FIG. 7 without the top plate and illustrating the array of support pegs and tabs of the removable support ring.
Figure 11:
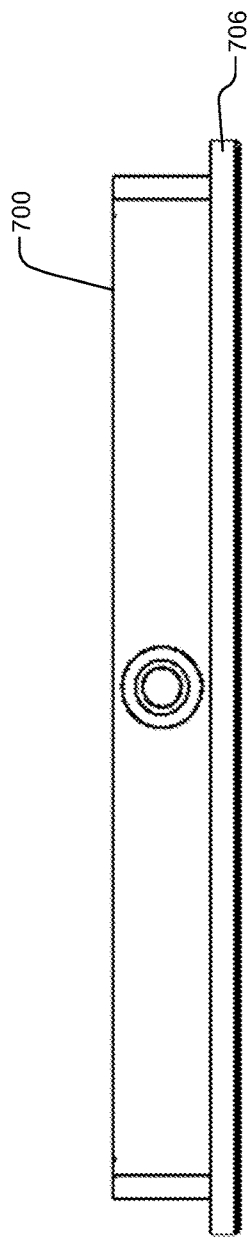
FIG. 11 is an end view of the fixture assembly of FIG. 7.
Figure 12:
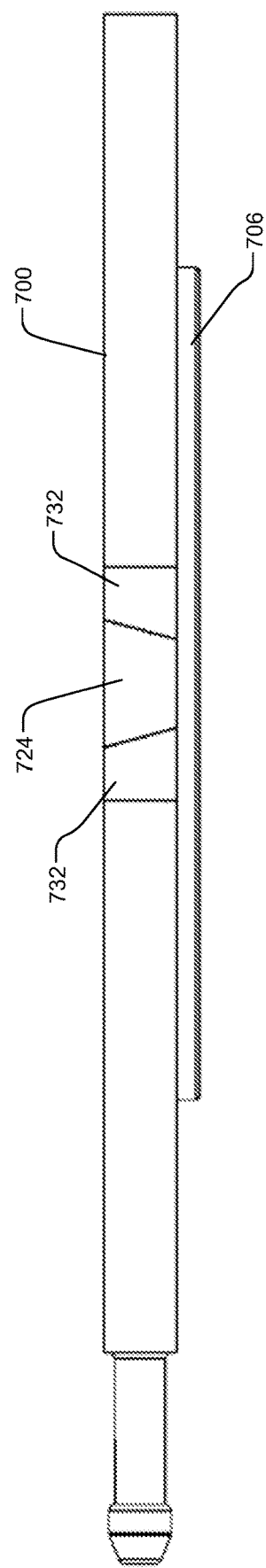
FIG. 12 is a side view of the fixture assembly of FIG. 7.

The baseplate 204 includes side walls 214 that extend upward from a bottom plate 216 and support pegs 218. The side walls 214 may include a recessed edge 219 for receiving the top plate 202. In an embodiment, an array of support pegs is included as shown, which are arranged in rows and columns. The support pegs 218 support the top plate 202 relative to the bottom plate 216 and prevent buckling and/or bending of the top plate 202 and/or the bottom plate 216. The support pegs 218 are not in alignment with the holes 208. FIG. 10 shows another example embodiment having a same support peg and hole pattern layout as the embodiments of FIGS. 2-6. In FIG. 10, both support pegs and holes are shown, where the support pegs are laterally offset from the holes.

Figure 3:
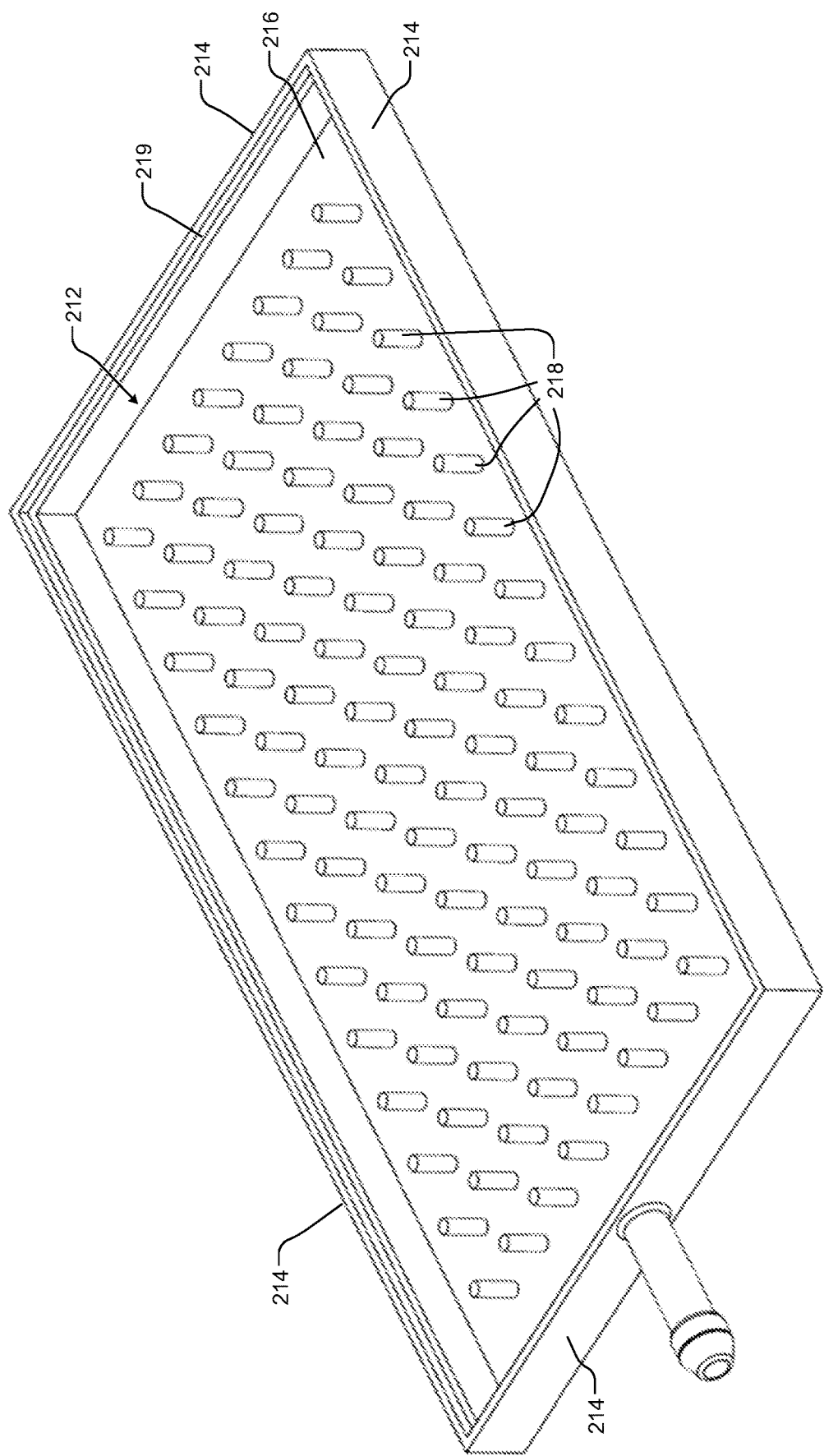
FIG. 3 is a perspective view of a baseplate of the fixture assembly of FIG. 2.

The support pegs 218 of FIG. 3 may be cylindrical-shaped as shown or may have different shape to adjust flow of air through the cavity 212. The support pegs may be shaped for improved vacuum and airflow (e.g., aerodynamic flow) to provide negative pressures over the entire top plate 202. For example, instead of the support pegs 218 having in a lateral direction a circular-shaped cross-section, having an oval-shaped cross-section, a rectangular-shaped cross-section, or a diamond-shaped cross-section. The support pegs 218 may be arranged differently than shown. For example, the support pegs 218 may not be in a rectangular array, but rather may be in an array having offset rows or offset columns. The support pegs 218 may be equally spaced from each other. The support pegs 218 may be offset from the holes 208. An example of this type of arrangement is shown in FIG. 10.

The fixture assembly 200 of FIGS. 2-6 may further include a hose connector 230 including a beveled tip 232 attached to a shaft 234, which extends from one of the side walls 214.

Figure 4:
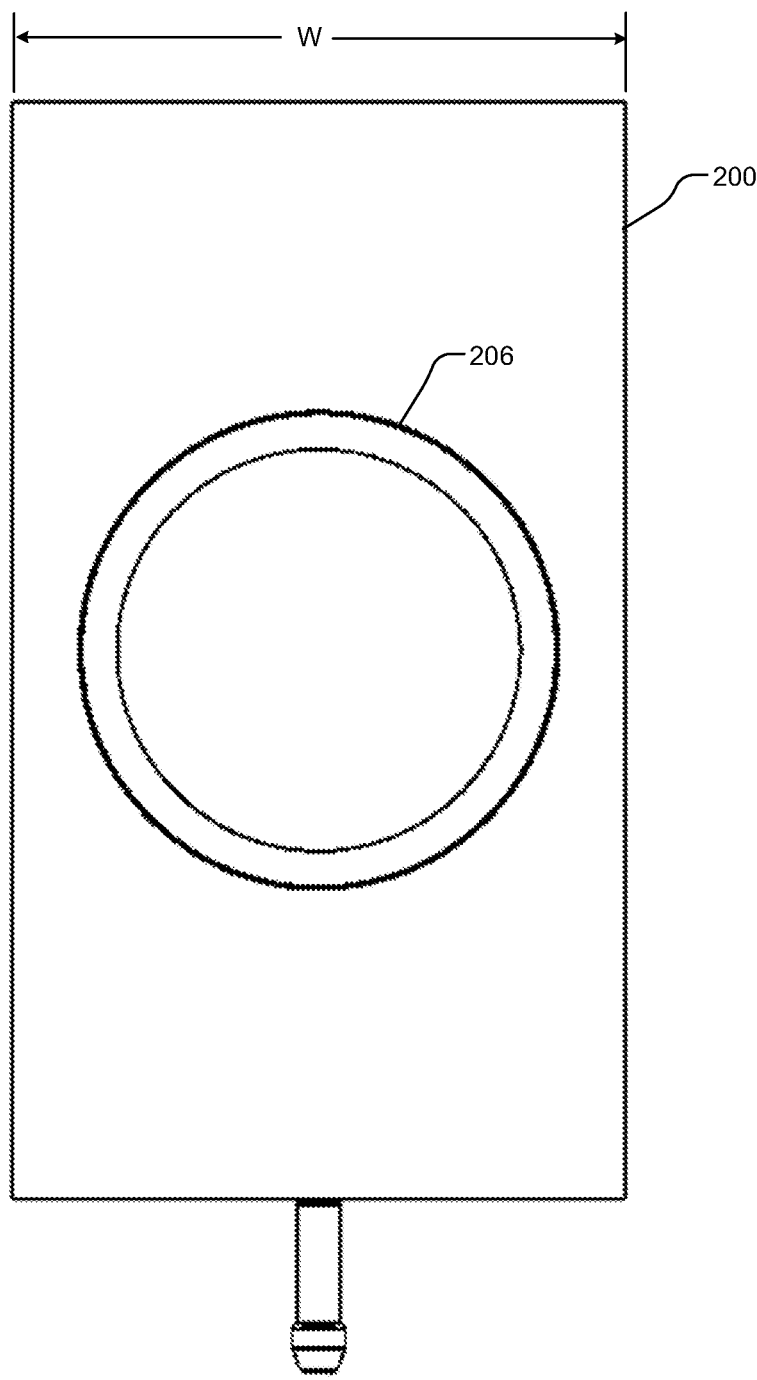
FIG. 4 is a bottom view of the fixture assembly of FIG. 2 illustrating a support ring.

The support ring 206 may be ring-shaped, as shown, or may be replaced with a support member having a different shape. Also, the diameter of the support ring may be smaller or larger than a width W of the baseplate 204 and/or the bottom plate 216. In FIG. 4, the diameter is smaller than the width. In FIG. 10, the diameter of the corresponding support ring is larger than the width. The support ring 206 may match or be slightly smaller than the size and shape of the recessed portion 164 of FIG. 1 to aid in preventing movement of the fixture assembly 200 relative to the support plate 162. For example, the support ring 206 may be sized to match and/or be press fit into the recessed portion 164. In another embodiment, the support ring 206 may be sized to be outside of a press fit tolerance to allow the support ring 206 to be slid into the recessed portion 164 and contact inner side wall(s) of the recessed portion 164 without needing to be press fit into the recessed portion 164. An outer diameter of the support ring 206 may be within a predetermined range of the inner diameter of the recessed portion 164, for example, such that the outer diameter of the support ring 206 is 99.0-99.95% of the inner diameter of the recessed portion 164.

FIGS. 7-13 show another example fixture assembly 700. The fixture assembly 700 may include a top plate 702, a baseplate 704, and one or more support elements. In the example shown, the one or more support elements include a removable support ring 706. FIGS. 7-13 show one example method for attaching a support ring (or support element) to the baseplate 704, other attachment methods may be implemented. The fixture assembly 700 may be similar to the fixture assembly 200 of FIG. 2 but be configured for the removable support ring 706.

Two side walls 720, 721 of the baseplate 704 may include 'V'-shaped guides 722, 724 that are integrally formed as part of the side walls 720, 721 and protrude laterally outward from the side walls 720, 721. The removable support ring 706 includes a support ring 730 and two pairs of tabs 732, 734, Each of the pairs of tabs 732, 734 extends vertically from the support ring 730. The 'V'-shaped guides 722, 724 slide between and/or engage with respective pairs of tabs 732, 734, as shown. The guides 722, 724 may include, for example, grooves or channels that engage with teeth or pins of the tabs 732, 734 or vice versa. The pairs of tabs 732, 734 may be integrally formed with the support ring 730 as a single part. The tabs 732, 734 hold the support ring 730 in a proper position relative to the baseplate 704.

In an embodiment, the tabs 732, 734 include end hooks that overlap top portions of the side walls 720, 721 to hold the support ring 730 to the baseplate 704. In this arrangement the removable support ring 706 is referred to as a clip-on support ring. The end hooks may be integrally formed with the tabs 732, 734. Two example end hooks 736 are shown with dashed lines in FIG. 7. Similar hooks may be included as part of tabs 734. Other arrangement may be made such that the end hooks do not extend above the top plate 702. For example, the side walls 720, 721 may have notches that receive the end hooks, such that ends (or top surfaces) of the end hooks are flush with a top surface 740 of the top plate 702.

The top plate 702 may include a pattern of holes, such as an array of holes 742, as shown. The top plate 702 may be disposed on a recessed ledge 743 of the baseplate 704. The baseplate 704 may include a pattern of support pegs, such as an array of support pegs 744, as shown. In FIG. 10, the 'V'-shaped guides 722, 724, pairs of tabs 732, 734, the array of holes 742, the recessed ledge 743, and the array of support pegs 744 are shown with phantom lines.

Figure 7:
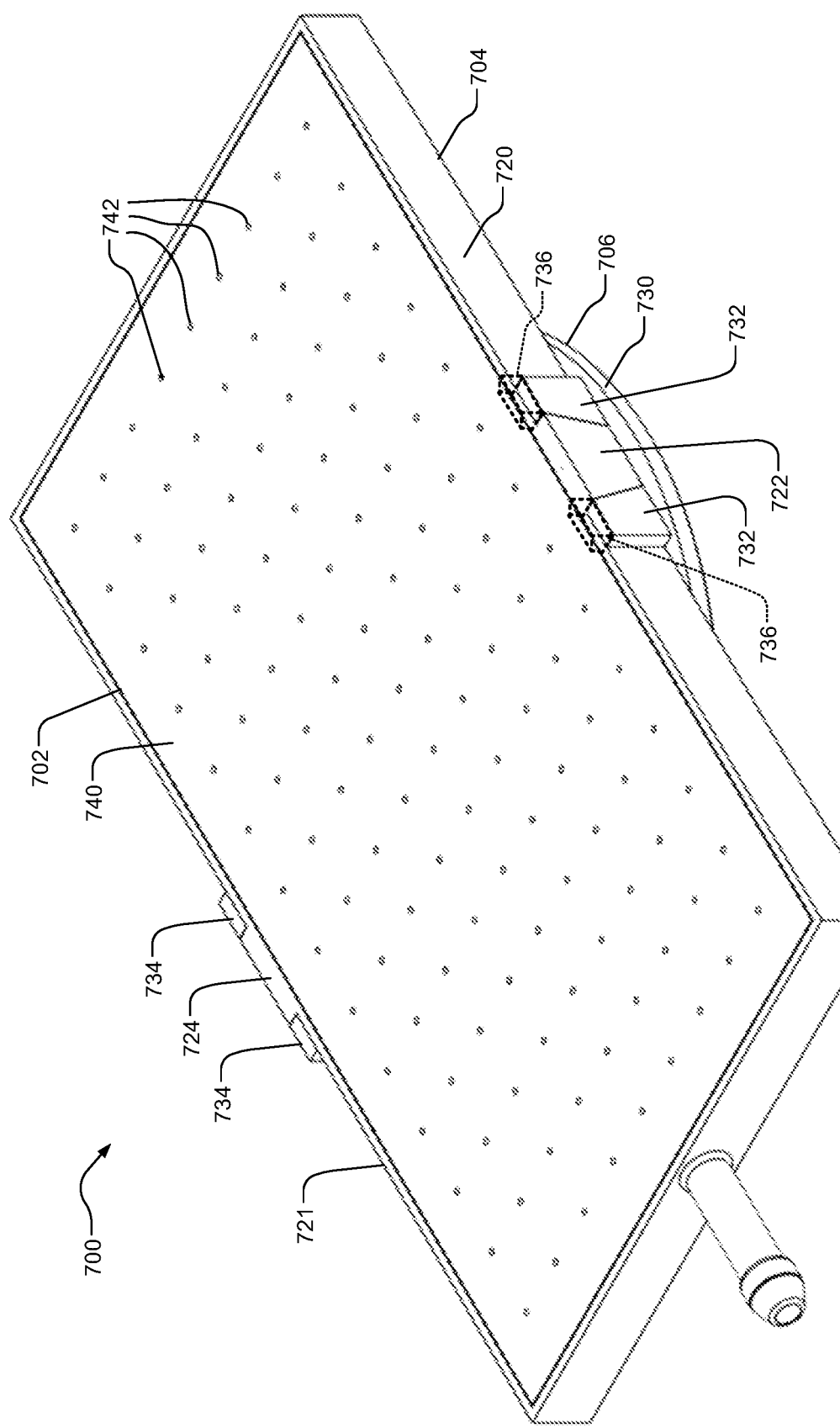
FIG. 7 is a perspective view of another example fixture assembly incorporating a top plate with an array of vacuum holes, a baseplate and a removable support ring in accordance with another embodiment of the present disclosure.
Figure 8:
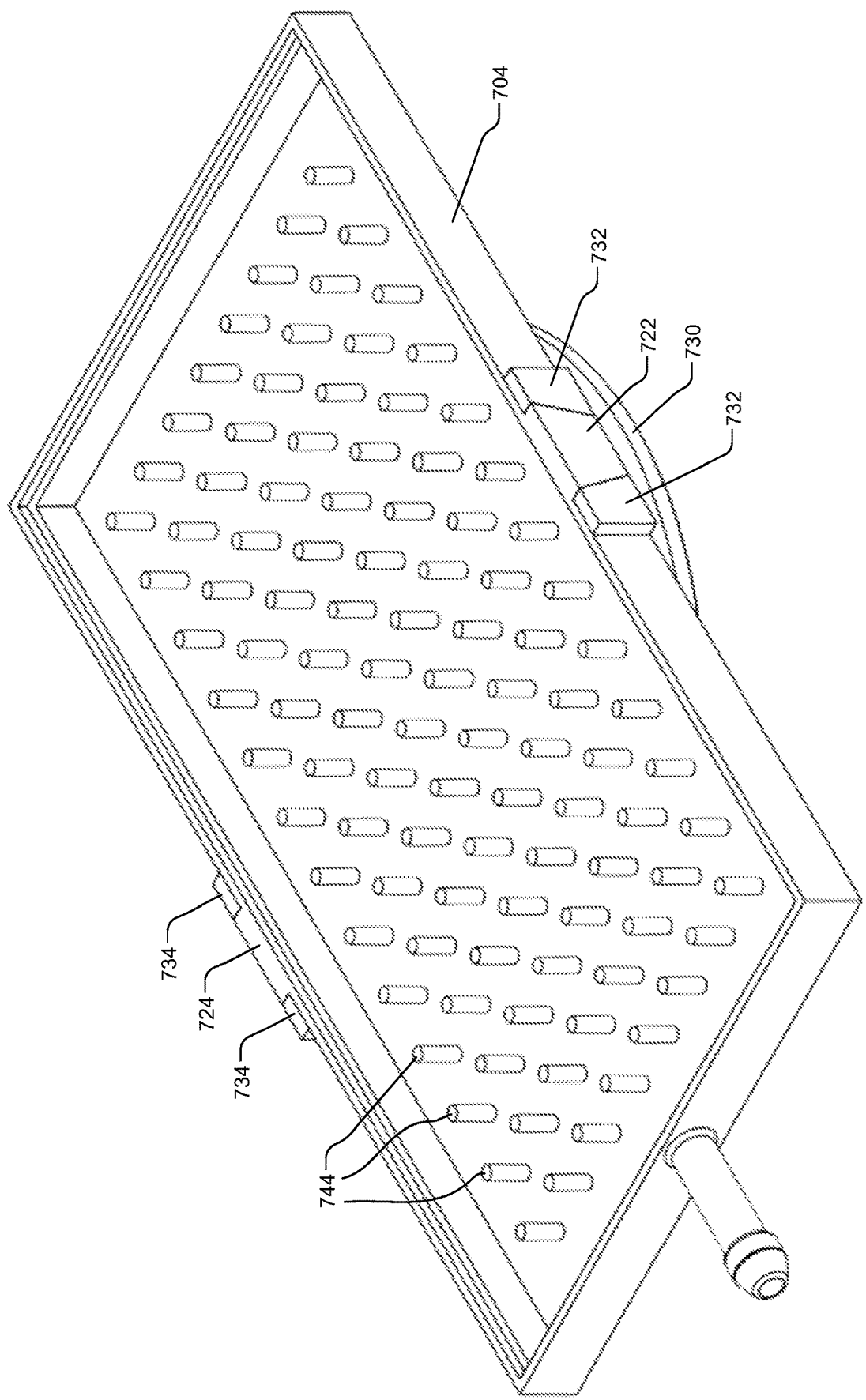
FIG. 8 is a perspective view of a baseplate of the fixture assembly of FIG. 7 illustrating an array of support pegs.
Figure 13:
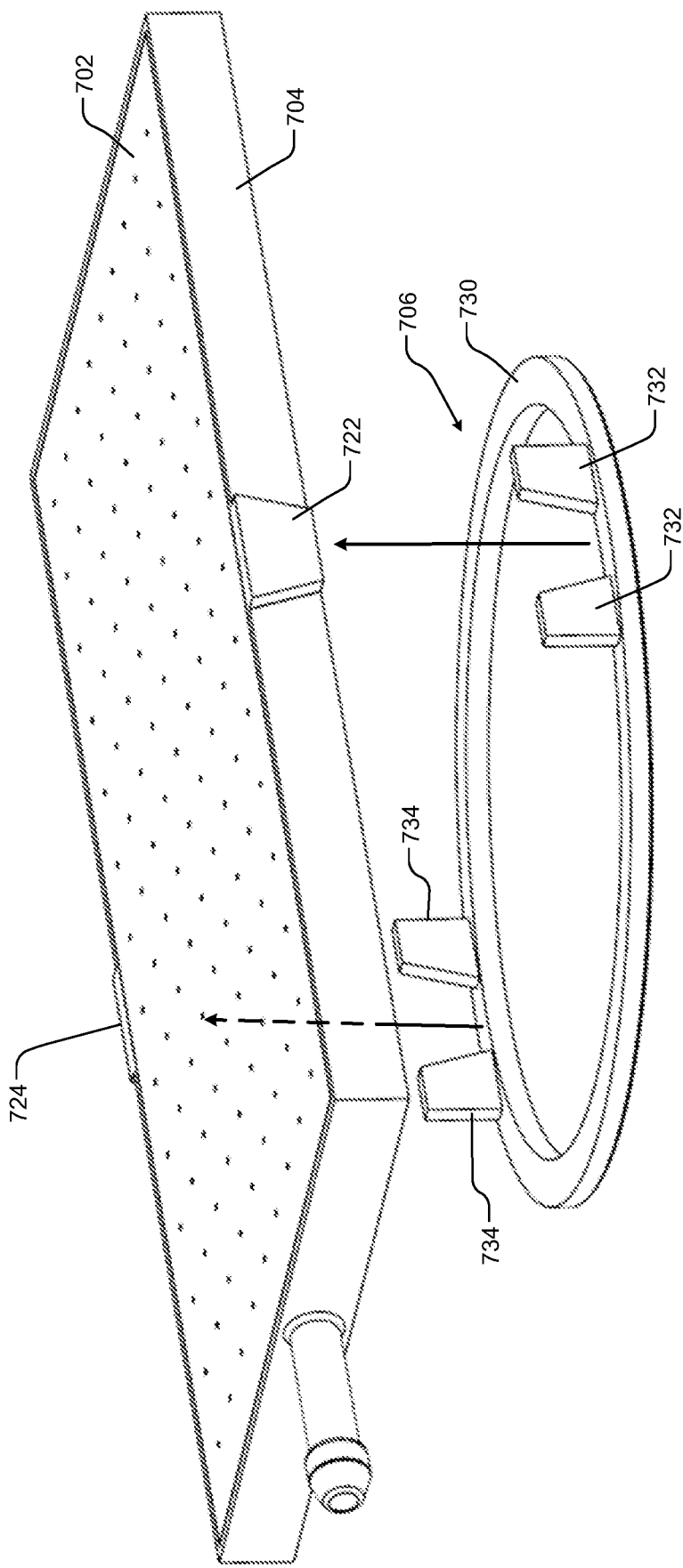
FIG. 13 is a side perspective view of the fixture assembly of FIG. 7 with the removable support ring separated from the baseplate.

FIG. 13 shows the fixture assembly 700 of FIG. 7 with the removable support ring 706 separated from the baseplate 704. The fixture assembly 700 includes the top plate 702 and the baseplate 704 having the 'V'-shaped guides 722, 724.

FIG. 14 shows a top plate 1400 with an example pattern of holes, which are in the form of slots 1402. The top plate 1400 may replace the top plates of the above-described fixture assemblies. Although two rows of slots are shown, any number of rows may be included. In the example shown, the rows of slots 1402 are located near opposite sides 1404 of the top plate. The slots 1402 are located closer to the sides 1404 than a centerline 1406 of the top plate 1400. This aids in securing a foil or electrode to the top plate 1400 while at the same time minimizing the number of slots included in the top plate 1400.

FIG. 15 shows a top plate 1500 with an example pattern of square-shaped holes 1502. The top plate 1500 may replace the top plates of the above-described fixture assemblies. Although four rows of holes are shown, any number of rows may be included. In the example shown, the rows of holes 1502 are located near opposite sides 1504 of the top plate 1500. The holes 1502 are located closer to the sides 1504 than a centerline 1506 of the top plate. This aids in securing a foil or electrode to the top plate 1500 while at the same time minimizing the number of holes included in the top plate 1500.

The above disclosed fixture assemblies allow in-situ measurement of physical properties of current collectors while and/or after the current collectors are being coated with active material. Current collectors may be coated using a slurry of active material that is spread over the current collectors based on measurements being taken to uniformly coat the current collectors. Thus, the sample (foil or battery electrode) is able to be measured without movement of the sample and during or after deposition of material on the sample. The fixture assemblies also allow for ex-situ measurement of physical properties of battery electrodes after coating of active material on current collectors. The fixture assemblies may be, for example, located on a measuring device that is separate from a coating machine. The fixture assemblies aid in maintaining foils and battery electrodes in unwrinkled states for accurate measurements. This prevents, for example, captured images from being out-of-focus due to wrinkles and/or collection of noisy or inaccurate data from sensors. The fixture assemblies allow for nondestructive testing and measuring of foils and battery electrodes for quality verification and material characterization purposes. This aids in evaluating the feasibility of instruments and/or equipment where the fixture assemblies are implemented for measuring physical properties of battery electrodes. The disclosed fixture assemblies are able to be integrated into various lab-scale nondestructive evaluation (NDE) systems for battery electrode characterization.

The disclosed fixture assemblies are applicable for single-sided and double-sided measurements of foils and battery electrodes. As an example, a first measurement may be taken while a foil or electrode is in a first position and/or orientation on a fixture assembly and then the foil or electrode may be flipped over and a second measurement may be taken. The measurements may be taken when the foils and battery electrodes are wet or dry. Characterization may thus be implemented for wet, dry and/or calendared battery electrodes. The fixture assemblies are able to be rotated when on or in a measuring device for measurements at different angles. This may include, for example, rotating a supporting member (e.g., supporting ring) of a fixture assembly to rotate the corresponding top plate and baseplate of the fixture assembly. In one embodiment, a first thickness measurement of a foil is taken, then an active material layer is deposited on the foil, and then a second overall thickness measurement is taken. Based on the first and second measurements, a thickness of the active material layer is determined.

The fixture assemblies disclosed herein minimize and/or eliminate i) experimental error associated with lack of flatness of foils and battery electrodes, and/or ii) human error associated with a user holding and moving foils and battery electrodes on, off, in and/or out of instruments (or measuring devices and systems).

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A fixture assembly for testing or measuring at least a portion of a battery electrode, the fixture assembly comprising:
    a top plate comprising a plurality of holes for creating a low-pressure region along a top surface of the top plate to hold the at least a portion of the battery electrode to the top plate;
    a baseplate comprising
        a bottom plate, and
        a plurality of side walls extending upward from the bottom plate and defining a vacuum chamber with the top plate;
    a connector attached to the baseplate and configured to be connected to a vacuum hose for drawing air from the vacuum chamber to pull the at least a portion of the battery electrode to the top plate; and
    a support member attached to the baseplate and configured to hold the fixture assembly in place relative to a measuring device that measures a physical characteristic of the at least a portion of the battery electrode,
    wherein at least one of
        the plurality of side walls comprise an inner ledge on which the top plate is disposed such that the top surface of the top plate is flush with top surfaces of the plurality of side walls, and
        the baseplate comprises a plurality of support pegs for supporting the top plate relative to the bottom plate, the plurality of support pegs extending within the vacuum chamber and from the bottom plate.

2. The fixture assembly of claim 1, wherein the plurality of holes of the top plate comprise an array of holes arranged in rows and columns.

3. The fixture assembly of claim 1, wherein the plurality of holes of the top plate comprise two rows of slots arranged closer to opposite sides of the top plate than a centerline of the top plate and do not include other slots.

4. The fixture assembly of claim 1, wherein the plurality of holes of the top plate comprise rows of holes arranged closer to opposite sides of the top plate than a centerline of the top plate and do not include other holes.

5. The fixture assembly of claim 1, wherein the plurality of holes comprise a first set of holes and a second set of holes, the second set of holes being sized differently than the first set of holes.

6. The fixture assembly of claim 1, wherein the plurality of holes comprise a first set of holes and a second set of holes, the second set of holes being shaped differently than the first set of holes.

7. The fixture assembly of claim 1, wherein the plurality of holes comprise first rows of holes that are laterally offset from second rows of holes of the top plate.

8. The fixture assembly of claim 1, wherein the plurality of side walls are configured to hold the top plate.

9. The fixture assembly of claim 1, wherein the plurality of support pegs are laterally offset from the plurality of holes of the top plate.

10. The fixture assembly of claim 1, wherein at least two of the top plate, the baseplate, the connector and the support member are integrally formed as a single part.

11. The fixture assembly of claim 1, wherein:
    two of the plurality of side walls comprise guides; and
    the support member is ring-shaped and comprises two pair of tabs extending upward and configured to at least one of engage with and slide adjacent to the guides to position the support member relative to the bottom plate.

12. A characterization system comprising:
an instrument;
a fixture assembly for testing or measuring at least a portion of a battery electrode, the fixture assembly comprising
- a top plate comprising a plurality of holes for creating a low-pressure region along a top surface of the top plate to hold the at least a portion of the battery electrode to the top plate;
- a baseplate comprising
  - a bottom plate, and
  - a plurality of side walls extending upward from the bottom plate and defining a vacuum chamber with the top plate;
- a connector attached to the baseplate and configured to be connected to a vacuum hose for drawing air from the vacuum chamber to pull the at least a portion of the battery electrode to the top plate; and
- a support member attached to the baseplate and configured to hold the fixture assembly in place relative to a measuring device that measures a physical characteristic of the at least a portion of the battery electrode, wherein the fixture assembly is disposed on or in the instrument;
a vacuum pump connected to the connector of the fixture assembly and configured to draw air from the fixture assembly; and
a network device configured to control operation of the instrument and the vacuum pump to hold the at least a portion of the battery electrode to the top plate and measure the physical characteristic of the at least a portion of the battery electrode.

13. The characterization system of claim 12, wherein the instrument comprises at least one sensor configured to measure the physical characteristic of the at least a portion of the battery electrode.

14. The characterization system of claim 12, wherein:
the instrument comprises a support plate with a recessed portion; and
the support member is disposed at least partially within the recessed portion and prevents lateral movement of the fixture assembly relative to the support plate.

15. The fixture assembly of claim 1, wherein the plurality of support pegs and the bottom plate are integrally formed as a single part.

16. The fixture assembly of claim 1, wherein:
the plurality of support pegs are disposed within and distributed throughout the vacuum chamber to support respective portions of the top plate relative to the bottom plate; and
the top plate is disposed on the plurality of support pegs.

17. A characterization system for testing and measuring parameters of at least a portion of a battery electrode, the characterization system comprising:
an instrument comprising a support plate, the support plate comprising a recessed portion;
a fixture assembly comprising i) a top plate with a plurality of holes, ii) an inner cavity fluidically coupled to the plurality of holes, and iii) a support member, wherein the fixture assembly is disposed on the support plate such that at least a portion of the support member is disposed in the recessed portion of the support plate;
a vacuum pump connected to the fixture assembly and configured to draw air from the inner cavity to pull the at least a portion of the battery electrode to the top plate; and
a network device configured to control operation of the instrument and the vacuum pump to hold the at least a portion of the battery electrode to the top plate and measure the parameters of the at least a portion of the battery electrode.

18. The characterization system of claim 17, wherein the fixture assembly comprises a baseplate comprising:
a bottom plate;
a plurality of side walls extending upward from the bottom plate and defining a vacuum chamber with the top plate; and
a plurality of support pegs disposed between the top plate and the bottom plate.

19. The characterization system of claim 17, wherein:
the fixture assembly comprises a plurality of side walls;
the plurality of side walls comprise guides; and
the support member is ring-shaped and comprises two pair of tabs extending upward and configured to at least one of engage with and slide adjacent to the guides to i) position the support member relative to the top plate, and ii) position the top plate relative to the support plate of the instrument.

20. The characterization system of claim 17, wherein:
the plurality of holes comprise a first set of holes and a second set of holes; and
the first set of holes are at least one of shaped and sized differently than the second set of holes.

* * * * *